United States Patent
Fidan

(10) Patent No.: US 6,629,562 B1
(45) Date of Patent: Oct. 7, 2003

(54) DOWNHOLE FISHING TOOL FOR RETRIEVING METALLIC DEBRIS FROM A BOREHOLE

(75) Inventor: Mehmet Fidan, Roeyneberg (NO)

(73) Assignee: ConocoPhillips Company, Houston, TX (US)

( * ) Notice: Subject to any disclaimer, the term of this patent is extended or adjusted under 35 U.S.C. 154(b) by 0 days.

(21) Appl. No.: 10/096,268

(22) Filed: Mar. 12, 2002

(51) Int. Cl.[7] .............................................. E21B 37/00
(52) U.S. Cl. ........................................ 166/99; 166/66.5
(58) Field of Search ..................... 166/255.1, 250.12, 166/301, 311, 99; 294/65.5

(56) References Cited

U.S. PATENT DOCUMENTS

| | | | |
|---|---|---|---|
| 2,834,630 A | 5/1958 | Greer | 294/65.5 |
| 2,857,970 A * | 10/1958 | Hopkins | 166/66.5 |
| 3,905,631 A | 9/1975 | Ricks | 294/65.5 |
| 4,084,636 A | 4/1978 | Burge | 166/66.5 |
| 4,226,285 A | 10/1980 | Moseley, Jr. | 166/66.5 |
| 4,916,312 A | 4/1990 | Ellis et al. | 250/260 |
| 5,035,021 A * | 7/1991 | Le Devehat | 15/104.061 |
| 6,216,787 B1 | 4/2001 | Ruttley | 166/311 |
| 6,269,877 B1 * | 8/2001 | Zeer et al. | 166/66.5 |

* cited by examiner

Primary Examiner—William Neuder
Assistant Examiner—Matthew J Smith
(74) Attorney, Agent, or Firm—Kameron D. Kelly

(57) ABSTRACT

The invention is a system for retrieving loose metallic debris, such as stray radioactive marker bullets, from a borehole in a subterranean formation. The system can be used to retrieve stray radioactive marker bullets during placement of the radioactive marker bullets in the subterranean formation. The system utilizes a downhole fishing tool having at least one recessed magnetic surface for attracting and holding stray radioactive marker bullets. The recessed magnetic surface allows the fishing tool to be removed from the borehole without scraping off retrieved marker bullets that are held against the magnetic surface.

27 Claims, 2 Drawing Sheets

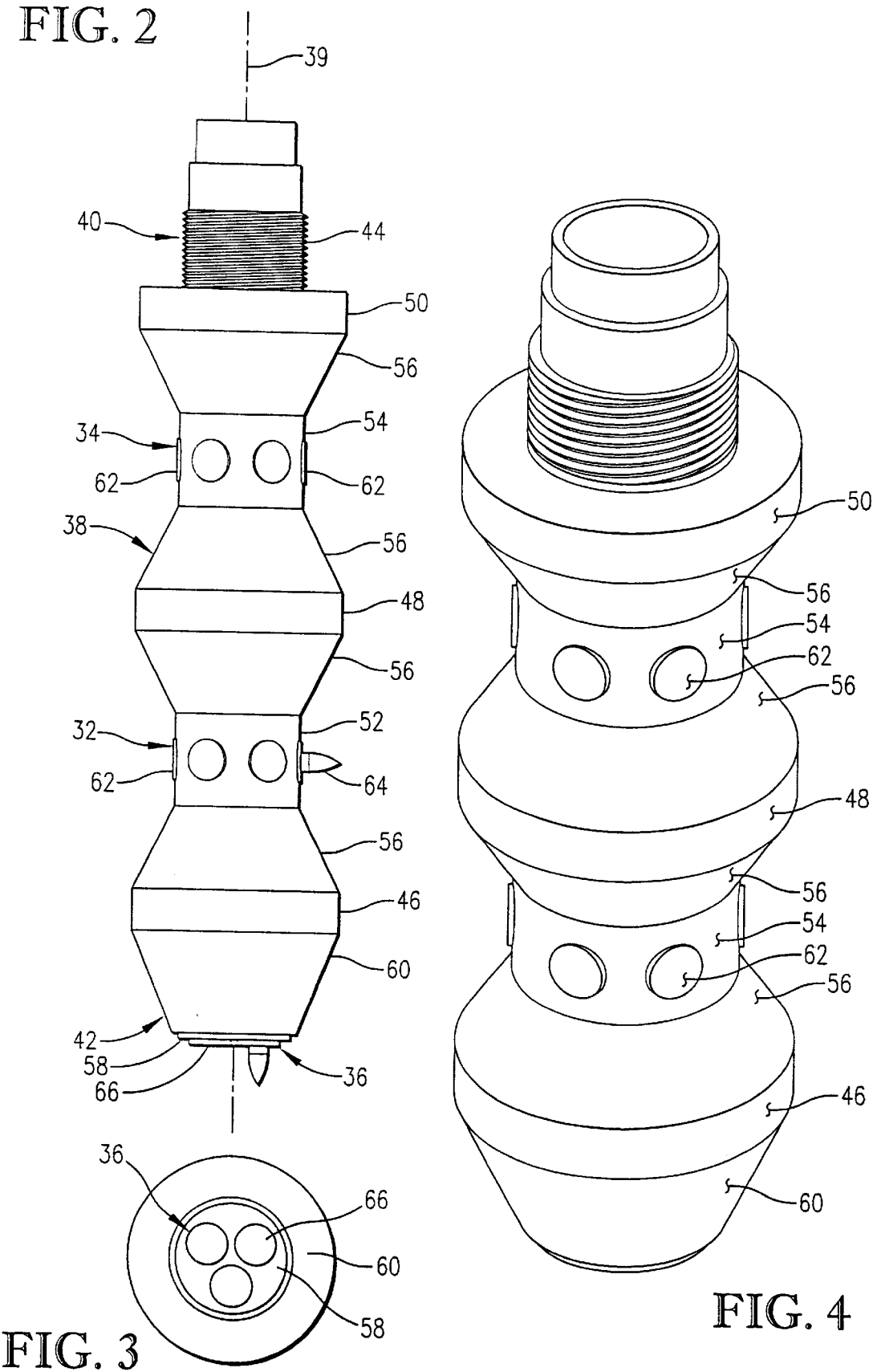

DOWNHOLE FISHING TOOL FOR RETRIEVING METALLIC DEBRIS FROM A BOREHOLE

BACKGROUND OF THE INVENTION

1. Field of the Invention

The present invention relates generally to systems which monitor the subsidence and compaction of subterranean formations by measuring the shifting of spaced-apart radioactive marker bullets implanted in the formation. In another aspect, the invention concerns a method and apparatus for retrieving stray radioactive marker bullets loosely positioned in a subterranean borehole.

2. Description of the Prior Art

The production of water and hydrocarbon fluids from subterranean formations depletes reservoir pressure and removes the fluids from the interstatial pores of the subterranean formation. As fluids are removed, the reduction of pressure in the subterranean formation may cause collapsing (i.e., subsidence) and compaction of the subterranean formation. This subsidence and corresponding compaction is heightened when the subterranean formation comprises chalk or other rock having relatively high porosity and a low compressive strength. An excessive amount of subsidence may result in well casing failure or rig collapse. Further, excessive compaction can permanently damage the permeability and hydrocarbon producing capability of a subterranean formation if the interstatial pores are irreparably closed. It is therefore desirable to monitor the subterranean formation to detect the onset of subsidence and compaction.

One method of monitoring formation subsidence and compaction involves implanting radioactive bullets within the subterranean formation as depth markers. The positions of the implanted bullets can then be monitored over the years using a downhole logging tool which detects the gamma rays emitted by the radioactive bullets.

One common method of implanting radioactive marker bullets into a subterranean formation involves lowering a radioactive marker bullet gun into the borehole and firing radioactive marker bullets radially out from the radioactive marker bullet gun and into the formation. When the subterranean formation is formed of a high density rock, bullets fired from the radioactive marker bullet gun may bounce off the subterranean formation and can be lost in the borehole. Some of these "stray" radioactive marker bullets in the borehole may be partially lodged in the wall of the borehole or may be resting on ledges of the borehole wall. Other of the stray radioactive marker bullets may simply fall to the bottom of the borehole. These stray radioactive marker bullets are typically left in the borehole and cemented. When the next section of the borehole is drilled, some of the stray radioactive marker bullets may be crushed, thereby exposing the drilling mud to radioactive particles, and risking human exposure to radiation.

OBJECTS AND SUMMARY OF THE INVENTION

It is, therefore, an object of the present invention to provide a downhole fishing tool for retrieving stray radioactive marker bullets from a borehole during placement of radioactive marker bullets in a subterranean formation.

A further object of the invention is to provide a downhole tool assembly for implanting radioactive marker bullets into a subterranean formation and retrieving any stray radioactive marker bullets from the borehole.

A still further object of the invention is to provide a wellbore comprising a borehole, a stray radioactive marker bullet located in the borehole, and a downhole fishing tool for retrieving the stray radioactive marker bullet from the borehole.

Another object of the invention is to provide a method of retrieving stray radioactive marker bullets that does not require a fishing tool to be separately run down the borehole after the radioactive marker bullets are implanted into the subterranean formation.

It should be noted that the above-listed objects are exemplary, and not all of the above objects need to be accomplished by the invention described and claimed herein.

Accordingly, in one embodiment of the present invention, there is provided a downhole fishing tool comprising a main body and a side magnet. The main body extends along a longitudinal axis and presents a pair of axially spaced wide outer surfaces. The side magnet is coupled to the body and axially positioned between the wide outer surfaces. The side magnet presents a generally radially facing side surface. The wide outer surfaces are radially spaced from the longitudinal axis by a first maximum radial distance, while the side surface is radially spaced from the longitudinal axis by a second maximum radial distance. The first maximum radial distance is at least 10 percent greater than the second maximum radial distance.

In another embodiment of the present invention, there is provided a downhole fishing tool for retrieving radioactive marker bullets from a borehole extending into a subterranean formation. The downhole fishing tool comprises a main body, a first group of magnets, a second group of magnets, and a third group of magnets. The main body extends along a longitudinal axis and includes axially spaced proximal and distal ends. The body presents a first wide outer surface proximate the distal end, a third wide outer surface proximate the proximal end, and a second wide outer surface axially spaced from and positioned between the first and second wide outer surfaces. The first group of magnets is coupled to the body, circumferentially spaced from one another, and axially positioned between the first and second wide outer surfaces. The second group of magnets is coupled to the body, circumferentially spaced from one another, and axially positioned between the second and third wide outer surfaces. The magnets in the third group of magnets are coupled to the distal end oft he body and are spaced-apart from one another.

In still another embodiment of the present invention, there is provided an elongated downhole tool for inserting radioactive marker bullets into a subterranean formation and retrieving stray radioactive marker bullets not properly penetrating into the formation. The downhole tool comprises a radioactive marker bullet gun having a normally upper end and a normally lower end and a magnetic fishing tool having a proximal end coupled to the normally lower end of the radioactive marker bullet gun. The fishing tool includes a side magnet axially positioned between the proximal and distal ends of the body, and an end magnet positioned proximate the distal end of the tool. The side magnet presents an exposed side surface facing in a first direction and the end magnet presents an exposed bottom surface facing in a second direction. The first direction is within 30 degrees of perpendicular to the direction of extension of the longitudinal axis of the downhole tool. The second direction is within 30 degrees of parallel to the direction of extension of the longitudinal axis.

In a further embodiment of the present invention, there is provided a wellbore system in a subterranean formation comprising a borehole, a stray radioactive marker bullet, and a fishing tool. The borehole extends downwardly into the subterranean formation. The stray radioactive marker bullet is loosely positioned in the borehole. The fishing tool is positioned in the borehole and includes a plurality of magnets operable to attract and hold the stray radioactive marker bullet so that the stray radioactive marker bullet can be retrieved from the borehole along with the fishing tool.

In still a further embodiment of the present invention, there is provided a process comprising the steps of: (a) lowering a fishing tool into a borehole in a subterranean formation; (b) traversing the borehole with the fishing tool, thereby causing the fishing tool to be positioned proximate a stray radioactive marker bullet located in the borehole; (c) coupling the stray radioactive marker bullet to the fishing tool by magnetic attraction; and (d) retrieving the fishing tool and the radioactive marker bullet coupled thereto from the borehole.

BRIEF DESCRIPTION OF THE DRAWING FIGS.

A preferred embodiment of the present invention is described in detail below with reference to the attached drawing figures, wherein:

FIG. 2 is a side view of a downhole magnetic fishing tool constructed in accordance of the present invention, particularly illustrating the shape of the main body of the fishing tool as well as the position of the magnets on the body;

FIG. 3 is an end view of the downhole magnetic fishing tool illustrated in FIG. 2, particularly illustrating the end magnets attached to the distal end of the tool; and FIG. 4 is an isometric view of the downhole magnetic fishing tool illustrated in FIGS. 2 and 3.

DETAILED DESCRIPTION OF THE PREFERRED EMBODIMENT

Figure 1:
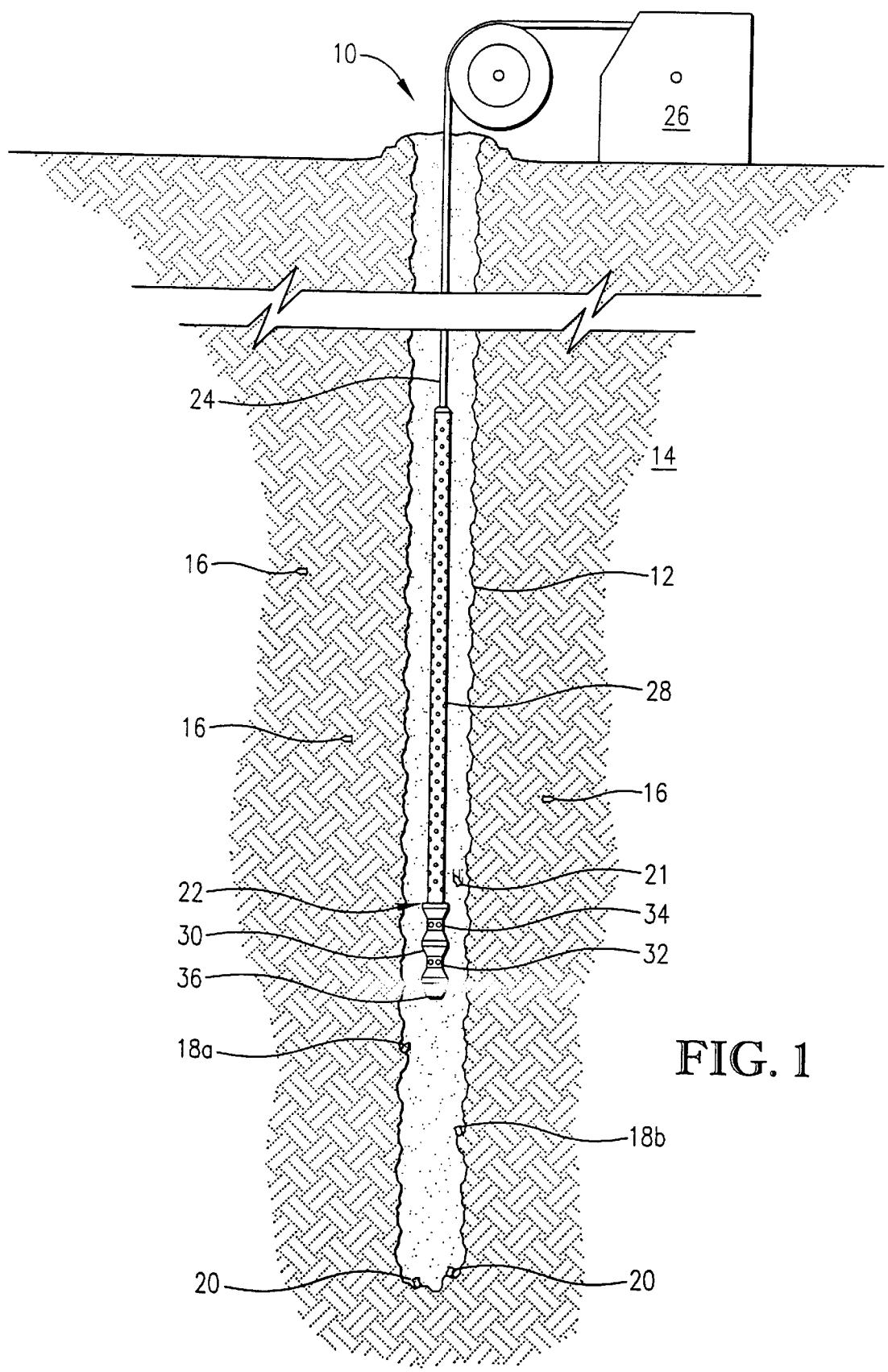
FIG. 1 is an elevation view of a wellbore system in a subterranean formation, particularly illustrating a downhole tool for implanting radioactive marker bullets and retrieving stray radioactive marker bullets lost in the borehole.

Referring initially to FIG. 1, a wellbore system 10 is illustrated as generally comprising a borehole 12 extending downward into a subterranean formation 14, implanted radioactive marker bullets (RMBs) 16, stray side RMBs 18, stray bottom RMBs 20, stray floating RMB 21, and a downhole tool assembly 22. Downhole tool assembly 22 is received in borehole 12 and is supported by a cable 24 which extends into borehole 12 and is coupled to surface equipment 26. Cable 24 and surface equipment 26 cooperate to raise and lower tool assembly 22 in borehole 12. Preferably, cable 24 is a wireline which not only physically supports tool assembly 22, but also includes electrical conductors for carrying power and/or electrical control signals from surface equipment 26 to tool assembly 22.

Downhole tool assembly 22 comprises a radioactive marker bullet gun 28 and a magnetic fishing tool 30. Gun 28 is operable to propel radioactive marker bullets (RMBs) outward and into subterranean formation 14. Properly implanted RMBs 16 are snugly received in subterranean formation 14 so that any local shifting of subterranean formation 14 causes corresponding shifting of implanted RMBs 16 in that location. Although gun 28 is designed to fire radioactive marker bullets into subterranean formation 14, several factors, such as improper operation of gun 28 and/or extremely high density of subterranean formation 14, may cause inadequate lodging of the radioactive marker bullets in subterranean formation 14. Such stray RMBs 18, 20, 21 may partially lodge in formation 14 (e.g., stray side RMB 18b), may fall (e.g., stray floating RMB 21) in borehole 12 and come to rest on a ledge of the sidewall of borehole 12 (e.g., stray side RMB 18a), or may simply fall to the bottom of borehole 12 (e.g., stray bottom RMBs 20).

Magnetic fishing tool 30 is operable to attract and hold stray RMBs 18, 20 which are relatively loosely positioned in borehole 12. Magnetic fishing tool 30 comprises a first group of side magnets 32, a second group of side magnets 34 axially spaced from the first group of side magnets 32, and a group of end magnets 36. Side magnets 32, 34 face generally outward toward the side walls of borehole 12 so that stray RMBs 18, 21 can be pulled into contact with and held against the outwardly facing surface of side magnets 32, 34 by magnetic force. End magnets 36 face generally downward toward the bottom of borehole 12 so that stray bottom RMBs 20 can be pulled into contact with and held against the downwardly facing surface of end magnets 36 by magnetic force.

RMBs 16, 18, 20, 21 can be any conventional bullet capable of being coupled to magnets 32, 24, 36 of fishing tool 30 by magnetic force. Preferably, RMBs 16, 18, 20, 21 include a quantity of a radioactive substance, for example, a pellet of Cesium 137 of about 100–150 micro-curies. The radioactive substance is preferably encased in a durable, metallic casing (shaped as a conventional bullet) which can be attracted to and held in contact with magnets 32, 24, 36 of fishing tool 30. Radioactive marker bullet gun 28 can be any conventional radioactive marker bullet gun capable of propelling radioactive marker bullets into subterranean formation 14. An example of a suitable radioactive marker bullet gun is the "E-Gun (Bullet) Perforating System" available from Baker Atlas, Houston, Tex. Another radioactive marker bullet gun which can be modified for use with fishing tool 30 is described in U.S. Pat. No. 4,916,312 (assigned to Schlumberger Technology), the entire disclosure of which is incorporated herein by reference. Other suitable radioactive marker bullet gun configurations are well known in the art.

Referring now to FIGS. 2–4, magnetic fishing tool 30 generally comprises an elongated main body 38 extending along a longitudinal axis 39 and three groups of magnets 32, 34, 36 coupled to body 38 at specific axial locations. Body 38 includes a proximal end 40 adapted to be coupled to a radioactive marker bullet gun and a distal end 42 which normally faces downward when fishing tool 30 is inserted into a borehole. Proximal end 40 preferably includes a male threaded member 44 for coupling fishing tool 30 to a normally lower end of a radioactive marker bullet gun.

The outer surface of main body 38 includes first, second, and third axially spaced wide outer surfaces 46, 48, 50, first and second axially spaced narrow outer surfaces 52, 54, a plurality of tapered axially spaced transition surfaces 56, a terminal end surface 58, and a terminal tapered surface 60. First wide outer surface 46 is located proximate distal end 42. Third wide outer surface 50 is located proximate proximal end 40. Second wide outer surface 48 is axially spaced from and positioned between first and third wide outer surfaces 46, 50. First narrow outer surface 52 is axially positioned between first and second wide outer surfaces 46, 48. Second narrow outer surface 54 is axially positioned between second and third wide outer surfaces 48, 50. Each transition surface 56 provides a tapered transition between one of narrow outer surfaces 52, 54 and an adjacent one of wide outer surfaces 46, 48, 50. Terminal tapered surface 60 provides a tapered transition between first wide outer surface 46 and terminal end surface 58. Preferably, wide outer surfaces 46, 48, 50 and narrow outer surfaces 52, 54 are substantially cylindrical in shape, transition surfaces 56 and terminal tapered surface 60 are substantially frustoconical in shape, and terminal end surface 58 is substantially flat.

First and second groups of side magnets 32, 34 are coupled to main body 38 proximate first and second narrow outer surfaces 52, 54, respectively. End magnets 36 are coupled to main body 38 proximate terminal end surface 58. Preferably magnets 32, 34, 36 are embedded in main body 38 by inserting each individual magnet into a respective bore in main body 38. Preferably, magnets 32, 34, 36 are generally cylindrical in shape. Magnets 32, 34, 36 can be fixed to main body 38 by any means known in the art such as, for example, glueing, soldering, or welding. Magnets 32, 34, 36 can be any magnet (permanent or electromagnet) of suitable strength for attracting and holding radioactive marker bullets thereto. Magnets 32, 34, 36 are preferably permanent magnets, more preferably rare earth permanent magnets, and most preferably samarium cobalt magnets.

First and second groups of side magnets 32, 34 each comprise a plurality of individual magnets which are circumferentially spaced around a respective narrow outer surface 52, 54 of main body 38. Preferably, each of first and second groups of side magnets 32, 34 comprises from 3 to 12 individual magnets, more preferably from 4 to 8 individual magnets. The individual magnets in each of first and second groups of side magnets 32, 34 are preferably substantially symmetrically spaced around longitudinal axis 39. Each magnet in first and second groups of side magnets 32, 34 presents a substantially flat outwardly-facing side surface 62. Side surfaces 62 preferably face generally radially away from longitudinal axis 39 of main body 38. Preferably, each side surface 62 of each individual magnet in the groups of side magnets 32, 34 faces in a direction which is within 30 degrees of perpendicular to the direction of extension of longitudinal axis 39, more preferably within 15 degrees of perpendicular to the direction of extension of longitudinal axis 39, and most preferably substantially perpendicular to the direction of extension of longitudinal axis 39.

Wide outer surfaces 46, 48, 50 are preferably substantially cylindrical and have substantially the same width. Wide outer surfaces 46, 48, 50 are radially spaced from longitudinal axis 39 by a maximum radial distance which is greater than the maximum distance between longitudinal axis 39 and side surfaces 62 of side magnets 32, 34. It is important for wide outer surfaces 46, 48, 50 to extend a greater radial distance from longitudinal axis 39 than side surfaces 62 of side magnets 32, 34 in order to protect a captured side RMB 64 from being disengaged from (i.e., "scraped off") side surface 62 by the sidewall of the borehole when fishing tool 30 is shifted up and down in the borehole. Preferably, the maximum radial distance between longitudinal axis 39 and wide outer surfaces 46, 48, 50 is at least 10 percent greater than the maximum radial distance between longitudinal axis 39 and side surfaces 62 of side magnets 32, 34, more preferably at least 20 percent greater, and most preferably at least 40 percent greater. As used herein, the term "maximum radial distance" means the maximum distance from a central axis (e.g., longitudinal axis 39) to any point on a particular surface or group of surfaces, measured perpendicular to the direction of extension of the central axis. The maximum radial distance between longitudinal axis 39 and wide outer surfaces 46, 48, 50 is preferably in the range of from about 1 inch to about 6 inches, more preferably in the range of from about 1.5 inches to about 4 inches, and most preferably in the range of from 2 inches to 3 inches.

Narrow outer surfaces 52, 54 are preferably substantially cylindrical and have substantially the same width. The maximum radial distance between longitudinal axis 39 and narrow outer surfaces 52, 54 is less than the maximum radial distance between longitudinal axis 39 and wide outer surfaces 46, 48, 50. The maximum radial distance between longitudinal axis 39 and narrow outer surfaces 52, 54 can be less than the maximum radial distance between longitudinal axis 39 and side surfaces 62 of side magnets 32, 34 (i.e., when side surfaces 62 of side magnets 32, 34 are slightly raised from narrow outer surfaces 52, 54). Alternatively, the maximum radial distance between longitudinal axis 39 and narrow outer surfaces 52, 54 and the maximum radial distance between longitudinal axis 39 and side surfaces 62 of side magnets 32, 34 is substantially the same (i.e., when side surfaces 62 of side magnets 32, 34 are substantially flush with narrow outer surfaces 52, 54).

Group of end magnets 36 comprises a plurality of spaced-apart individual magnets. Preferably, group of end magnets 36 comprises from 1 to 8 individual magnets, more preferably from 2 to 6 individual magnets, and most preferably 3 individual magnets. Each end magnet 36 presents a substantially flat downwardly-facing bottom surface 66. Bottom surfaces 66 preferably face generally axially away from main body 38 in a direction which is within 30 degrees of parallel to the direction of extension of longitudinal axis 39, more preferably within 15 degrees of parallel to the direction of extension of longitudinal axis 39, and most preferably substantially parallel to the direction of extension of longitudinal axis 39. The direction in which bottom surfaces 66 of end magnets 36 face and the direction in which each side surface 62 of side magnets 32, 34 face are preferably within 30 degrees of perpendicular to one another, more preferably within 15 degrees to perpendicular to one another, and most preferably substantially perpendicular to one another. Side surfaces 62 of side magnets 32, 34 and bottom surfaces 66 of end magnets 36 are preferably exposed (i.e., uncovered) so that radioactive marker bullets located away from side and bottom surfaces 62, 66 can be pulled directly into contact with and held against side and bottom surfaces 62, 66 by magnetic force.

Referring again to FIG. 1, in operation, downhole tool assembly 22 can be assembled by coupling magnetic fishing tool 30 to a normally lower end of radioactive marker bullet gun 28. A normally upper end of radioactive marker bullet gun 28 can then be coupled to cable 24. Downhole tool assembly 22 can then be lowered into borehole 12. Once in borehole 12, radioactive marker bullets (RMBs) can be propelled outwardly from gun 28 into subterranean formation 14. Stray RMBs 18, 20, 21 fired from gun 28 but not properly lodged in subterranean formation 14 may fall downward from gun 28 and towards magnetic fishing tool 30. As these stray RMBs (e.g., stray floating RMB 21) fall past fishing tool 30, they may become attracted by and coupled to side magnets 32, 34 of fishing tool 30. Some of the stray RMBs (e.g., stray side RMB 18*a*) may fall past magnetic fishing tool 30 and come to rest on ledges of the sidewall of borehole 12. Other of the stray RMBs (e.g., stray bottom RMBs 20) may fall to the bottom of borehole 12. Stray RMBs 18, 21 can be pulled into contact with and coupled to side magnets 32, 34 of fishing tool 30 when fishing tool 30 is passed by and/or contacted with stray side RMBs 18. Stray bottom RMBs 20 can be pulled into contact with and coupled to end magnets 36 when fishing tool 30 is lowered to the bottom of borehole 12. When downhole tool assembly 22 is removed from borehole 12, the stray RMBs coupled to magnets 32, 34, 36 of magnetic fishing tool 30 are removed therewith. Thus, downhole tool 22 allows implanted RMBs 16 to be fired into subterranean formation 14 and stray RMBs 18, 20, 21 to be retrieved from borehole 12 during a single run of downhole tool assembly 22 in borehole 12.

The preferred forms of the invention described above are to be used as illustration only, and should not be utilized in a limiting sense to interpret the scope of the present invention. Obvious modifications to the exemplary embodiments, set forth above could be readily made by those skilled in the art without departing from the spirit of the present invention.

The inventor hereby states his intent to rely on the doctrine of equivalence to determine and assess the reasonably fair scope of the present invention as pertains to any apparatus not materially departing from, but outside the literal scope of the invention as set forth in the following claims.

What is claimed is:

1. A downhole fishing tool comprising:
   a main body extending along a longitudinal axis, said body presenting a pair of axially spaced wide outer surfaces; and
   a side magnet coupled to the body and axially positioned between the wide outer surfaces,
   said side magnet presenting a generally radially facing side surface,
   said wide outer surfaces being radially spaced from the longitudinal axis by a first maximum radial distance,
   said side surface being radially spaced from the longitudinal axis by a second maximum radial distance,
   said first radial distance being at least 10 percent greater than the second radial distance,
   said side surface being exposed so that when the fishing tool passes by a metallic foreign object located away from the main body and the side magnet, the side magnet can pull the foreign object directly into contact with the side surface and hold the foreign object on the side surface by magnetic force.

2. A downhole fishing tool according to claim 1,
   said side surface facing generally away from the longitudinal axis in a first direction which is within 30 degrees of perpendicular to the direction of extension of the longitudinal axis.

3. A downhole fishing tool according to claim 2, and
   an end magnet coupled to a distal end of the main body and presenting a bottom surface facing in a second direction which is within 30 degrees of parallel to the direction of extension of the longitudinal axis.

4. A downhole fishing tool according to claim 3; and
   a plurality of additional circumferentially spaced side magnets coupled to the main body and axially positioned between the wide outer surfaces,
   each of said additional side magnets presenting an additional generally radially facing side surface.

5. A downhole fishing tool according to claim 4, and
   a plurality of additional spaced-apart end magnets each coupled to the distal end of the body and each presenting an additional generally axially facing bottom surface.

6. A downhole fishing tool according to claim 5,
   said body including a threaded member positioned proximate a proximal end of the body and operable to couple the body to a conventional downhole assembly.

7. A downhole fishing tool according to claim 1,
   said body further presenting a narrow outer surface axially positioned between the wide outer surfaces,
   said side magnet being positioned proximate the narrow outer surface.

8. A downhole fishing tool according to claim 7,
   said body further presenting a pair of axially spaced tapered outer transition surfaces each axially positioned between an end of the narrow outer surface and an end of a respective wide outer surface.

9. A downhole fishing tool according to claim 8,
   said narrow outer surface and said wide outer surfaces being substantially cylindrical,
   said transition surfaces being substantially frustoconical,
   said side surface being substantially flat.

10. A downhole fishing tool comprising:
    a main body extending along a longitudinal axis, said body presenting a pair of axially spaced wide outer surfaces; and
    a side magnet coupled to the body and axially positioned between the wide outer surfaces,
    said side magnet presenting a generally radially facing side surface,
    said wide outer surfaces being radially spaced from the longitudinal axis by a first maximum radial distance,
    said side surface being radially spaced from the longitudinal axis by a second maximum radial distance,
    said first radial distance being at least 20 percent greater than the second radial distance.

11. A downhole fishing tool according to claim 10,
    said first radial distance being at least 40 percent greater than the second radial distance.

12. A downhole fishing tool comprising:
    a main body extending along a longitudinal axis, said body presenting a pair of axially spaced wide outer surfaces; and
    a side magnet coupled to the body and axially positioned between the wide outer surfaces, said side magnet presenting a generally radially facing side surface,
    said wide outer surfaces being radially spaced from the longitudinal axis by a first maximum radial distance,
    said side surface being radially spaced from the longitudinal axis by a second maximum radial distance,
    said first radial distance being at least 10 percent greater than the second radial distance,
    said side surface being substantially flat.

13. A downhole fishing tool comprising:
    a main body extending along a longitudinal axis, said body presenting a pair of axially spaced wide outer surfaces; and
    a side magnet coupled to the body and axially positioned between the wide outer surfaces, said side magnet presenting a generally radially facing side surface,
    said wide outer surfaces being radially spaced from the longitudinal axis by a first maximum radial distance,
    said side surface being radially spaced from the longitudinal axis by a second maximum radial distance,
    said first radial distance being at least 10 percent greater than the second radial distance
    said body further presenting a narrow outer surface axially positioned between the wide outer surfaces,
    said side magnet being positioned proximate the narrow outer surface, said body further presenting a pair of axially spaced tapered outer transition surfaces each axially positioned between an end of the narrow outer surface and an end of a respective wide outer surface, said narrow outer surface being radially spaced from the longitudinal axis by a third maximum radial distance, said third radial distance being less than the first radial distance.

14. A downhole fishing tool according to claim 13, said third radial distance being less than the second radial distance.

15. A downhole fishing tool according to claim 13, said third radial distance being substantially the same as the second radial distance.

16. A downhole fishing tool for retrieving radioactive marker bullets from a borehole extending into a subterranean formation, said downhole fishing tool comprising:

a main body extending along a longitudinal axis and including axially spaced proximal and distal ends, said body presenting a first wide outer surface proximate the distal end, a third wide outer surface proximate to the proximal end, and a second wide outer surface axially spaced from and positioned between the first and third wide outer surfaces;

a first group of circumferentially spaced magnets coupled to the body and axially positioned between the first and second wide outer surfaces;

a second group of circumferentially spaced magnets coupled to the body and axially positioned between the second and third wide outer surfaces; and a third group of spaced-apart magnets coupled to the distal end of the body, each magnet in said first and second groups of magnets presenting a generally radially facing side surface, each magnet in said third group of magnets presenting a generally axially facing bottom surface, said side surface and said bottom surface being exposed so that when the downhole fishing tool passes by a metallic foreign object located away from the fishing tool, the foreign object can be pulled directly into contact with the side surface or the bottom surface and held against the side surface or bottom surface by magnetic force, said wide outer surfaces being generally cylindrical in shape, said side and bottom surfaces being substantially flat.

17. A downhole fishing tool according to claim 16, said wide outer surfaces being radially spaced from the longitudinal axis by a first maximum radial distance, said side surface of each magnet in said first and second groups of magnets being radially spaced from the longitudinal axis by a second maximum radial distance, said first radial distance being greater than the second radial distance.

18. A downhole fishing tool according to claim 17, said first radial distance being at least 10 percent greater than the second radial distance.

19. A downhole fishing tool according to claim 18, said first radial distance being at least 20 percent greater than the second radial distance.

20. An elongated downhole tool for inserting radioactive marker bullets into a subterranean formation and retrieving stray radioactive marker bullets not properly implanted in the formation, said downhole tool comprising:

a radioactive marker bullet gun having a normally upper end and a normally lower end; and a magnetic fishing tool having a proximal end coupled to the normally lower end of the radioactive marker bullet gun and a distal end, said fishing tool including side magnet positioned between the proximal and distal ends of the fishing tool and an end magnet positioned proximate the distal end of the fishing tool, said side magnet presenting an exposed side surface facing in a first direction and said end magnet presenting an exposed bottom surface facing in a second direction, said first direction being within 30 degrees of perpendicular to the direction of extension of a longitudinal axis of the downhole tool, said second direction being within 30 degrees of parallel to the direction of extension of the longitudinal axis, said side surface and said bottom surface being substantially flat, said first and second directions being within 30 degrees of perpendicular to one another.

21. An elongated downhole tool according to claim 20, said first direction being within 15 degrees of perpendicular to the direction of extension of the longitudinal axis, said second direction being within 15 degrees of parallel to the direction of extension of the longitudinal axis, said first and second directions being within 15 degrees of perpendicular to one another.

22. A wellbore system in a subterranean formation, said wellbore system comprising:

a borehole extending downward into the subterranean formation;

a stray radioactive marker bullet loosely positioned in the borehole; and a fishing tool positioned in the borehole and including a plurality of magnets operable to attract and hold the stray radioactive marker bullet so that the stray radioactive marker bullet can be removed from the borehole along with the fishing tool, said fishing tool including a main body extending along a longitudinal axis, said body presenting a pair of axially spaced wide outer surfaces, said magnets including a side magnet coupled to the body and axially positioned between the wide outer surfaces, said wider outer surfaces being radially spaced from the longitudinal axis by a first maximum radial distance, said side surface being radially spaced from the longitudinal axis by a second radial maximum distance, said first radial distance being at least 10 percent greater than the second radial distance.

23. A wellbore system according to claim 22; and a radioactive marker bullet gun positioned in the borehole and operable to propel a loaded radioactive marker bullet into the subterranean formation when actuated, said radioactive marker bullet gun being coupled to and positioned generally above the fishing tool.

24. A wellbore system according to claim 23; and an implanted radioactive marker bullet received in and fixed relative to the subterranean formation.

25. A wellbore system according to claim 24; and a wireline coupled to the radioactive marker bullet gun and extending upward through the borehole.

26. A wellbore system according to claim 22, said magnets including an end magnet coupled to the body and positioned proximate a lower end of the body, said end magnet presenting a bottom surface, said bottom surface facing in a direction which is within 30 degrees of perpendicular to the direction which the side surface faces.

27. A wellbore system according to claim 26, said side surface facing in a direction which is within 30 degrees of perpendicular to the direction of extension of the longitudinal axis.

* * * * *